(No Model.)  3 Sheets—Sheet 1.

W. HODGE.
COTTON HARVESTER.

No. 469,568.  Patented Feb. 23, 1892.

WITNESSES:
Fred G. Dieterich
W. D. Blondel

INVENTOR:
William Hodge.
BY
ATTORNEYS (No Model.) 3 Sheets—Sheet 2.

W. HODGE.
COTTON HARVESTER.

No. 469,568. Patented Feb. 23, 1892.

WITNESSES:
Fred G. Dieterich
M. Blondel

INVENTOR:
William Hodge.
BY
ATTORNEYS (No Model.) 3 Sheets—Sheet 3.

W. HODGE.
COTTON HARVESTER.

No. 469,568. Patented Feb. 23, 1892.

WITNESSES:
Fred G. Dieterich
M. D. Blondel

INVENTOR:
William Hodge.
BY Munn & Co
ATTORNEYS

UNITED STATES PATENT OFFICE.

WILLIAM HODGE, OF MEMPHIS, TENNESSEE.

COTTON-HARVESTER.

SPECIFICATION forming part of Letters Patent No. 469,568, dated February 23, 1892.

Application filed April 17, 1891. Serial No. 389,374. (No model.)

*To all whom it may concern:*

Be it known that I, WILLIAM HODGE, of Memphis, in the county of Shelby and State of Tennessee, have invented a new and useful Improvement in Cotton-Harvesters, of which the following is a specification.

This invention relates to an improved cotton harvester or picker, and has for its object to provide a machine that shall pick the cotton from the pod while growing and convey and deposit the same in a suitable receptacle carried by the machine.

A further object of my invention is to provide a construction whereby the picking mechanism is protected from the stems, &c.

With these objects in view my invention consists in the details of construction of certain parts and their novel combination or arrangement, all of which will be more fully hereinafter described and claimed.

Figure 1:
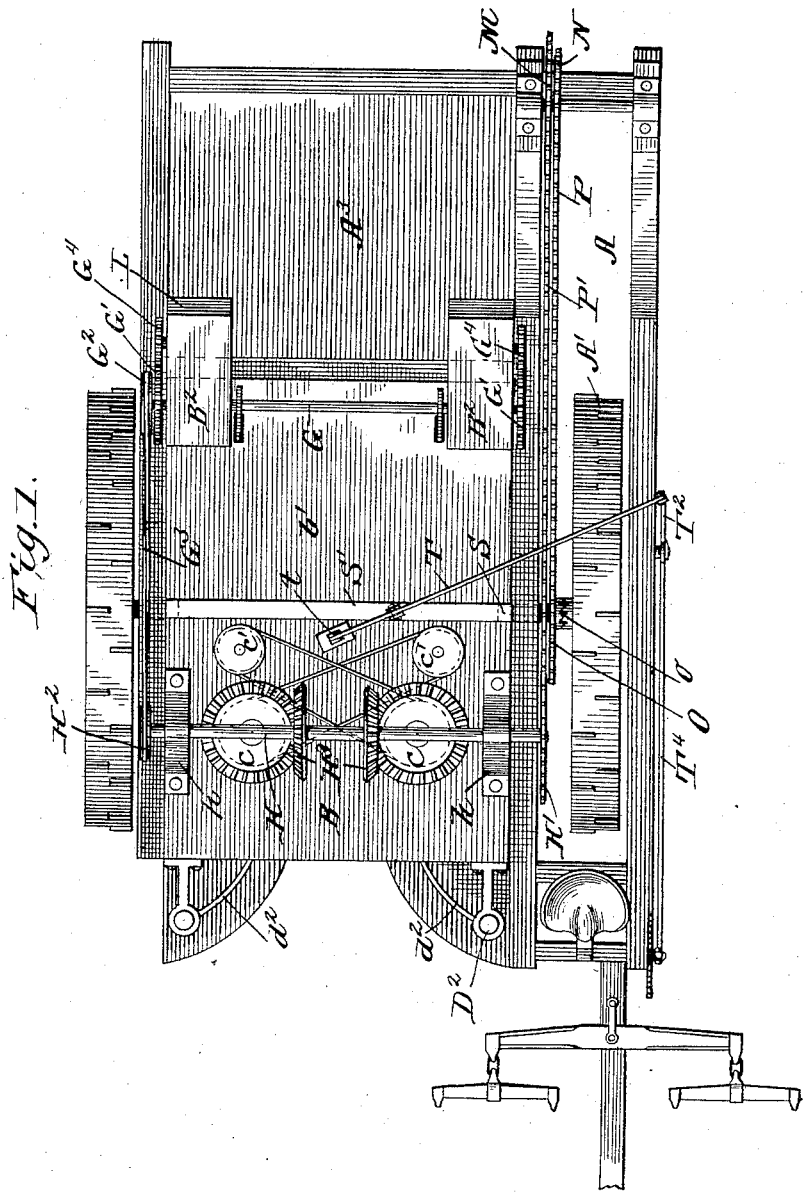
Figure 2:
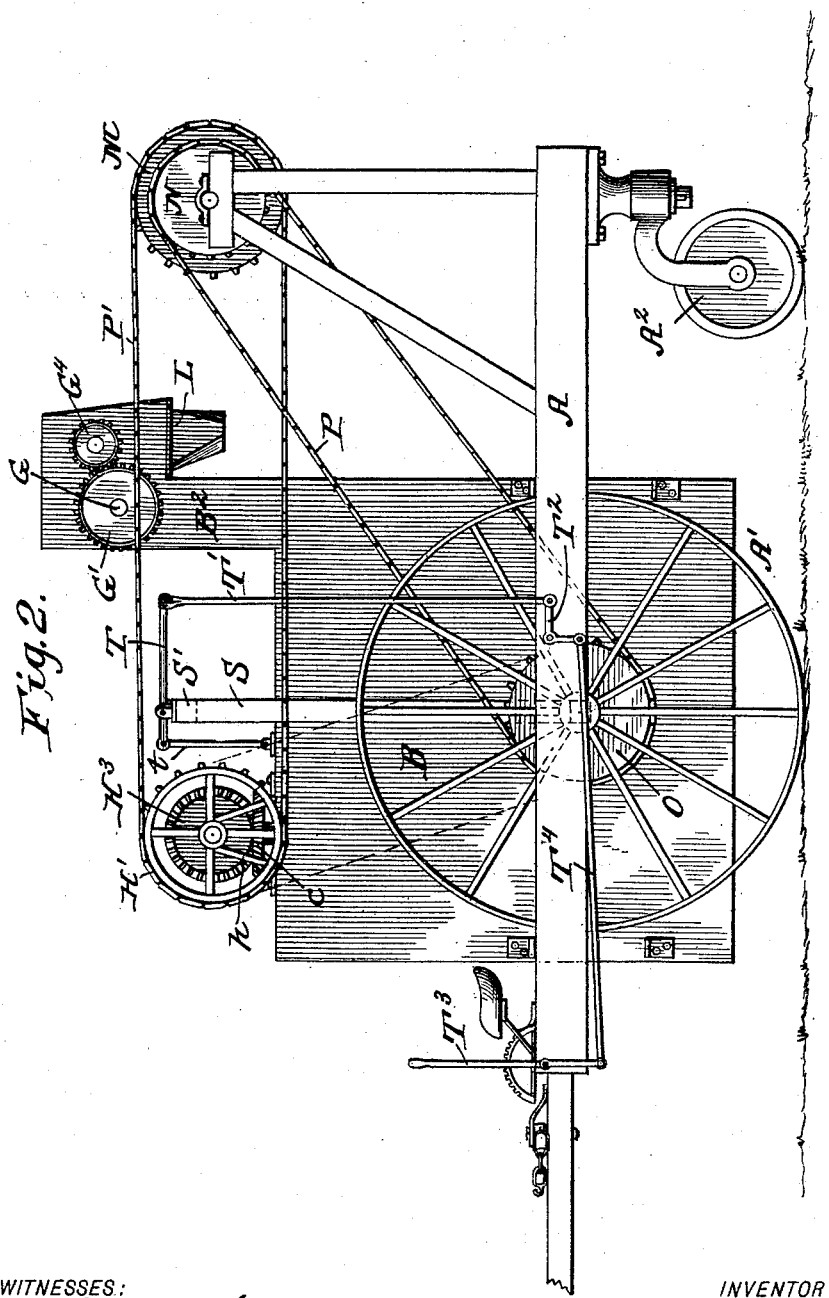
Figure 3:
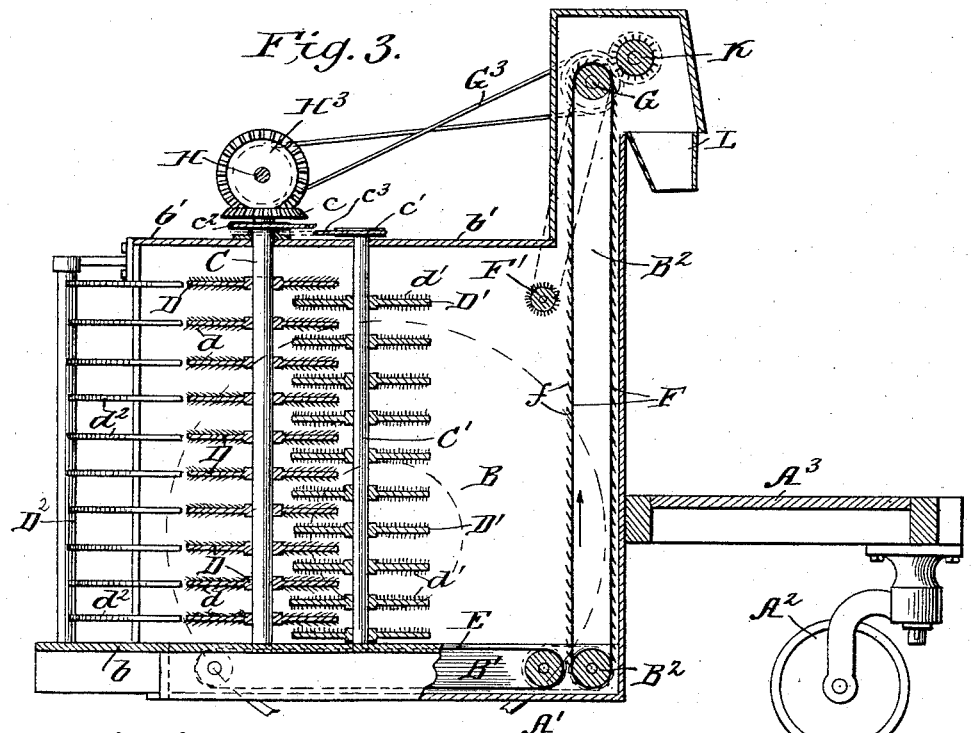
Figure 4:
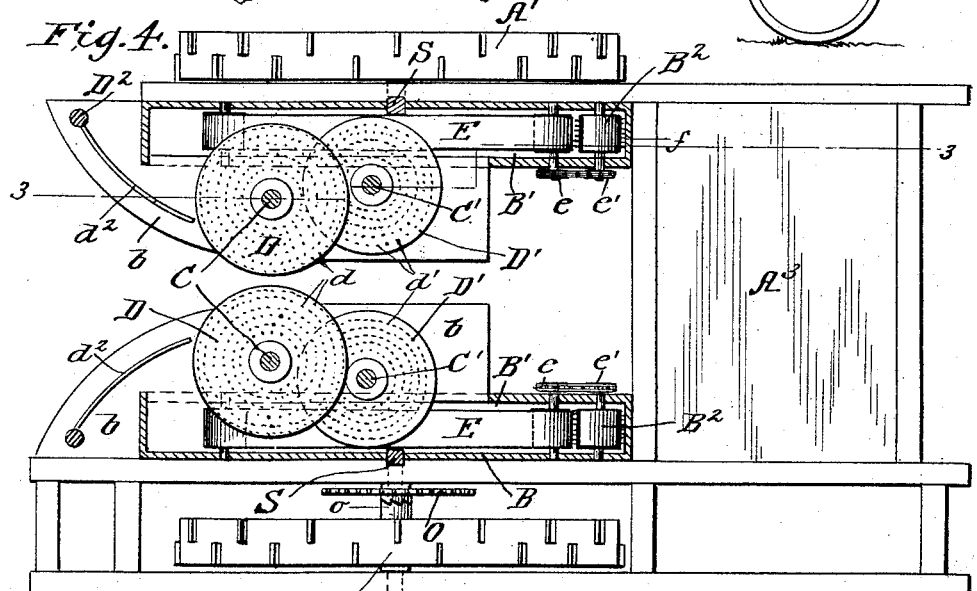

In the drawings forming a part of this specification, Figure 1 is a top plan view of my improved harvester. Fig. 2 is a side view of the same. Fig. 3 is a vertical section on the line 3 3 of Fig. 4, and Fig. 4 is a horizontal section.

In the practical embodiment of my invention I employ a horizontal frame A, mounted upon the traction-wheels A' and the caster-wheel $A^2$, said frame being essentially rectangular in shape, open at its forward end, and at its rear end is provided with a horizontal platform $A^3$. A receiving-box B is arranged between the side beams of the main frame, the said box being opened at its forward end, provided with a horizontally-divided platform $b$ at its bottom and a top or cover $b'$, the outer ends of the platform-sections tapering outwardly, as shown. Vertical shafts C C are journaled upon opposite sides of the longitudinal passage between the top of the box and its respective platform-sections, the upper ends of said shafts extending through the top of the box, and they are provided with the beveled or miter gears $c$ $c$. A series of circular picker-disks D D are mounted upon the shafts C C, said disks being provided with picking-teeth $d$ on both faces of the same. Vertical shafts C' C' are journaled to the rear of the shafts C C in a similar manner, but farther away from the longitudinal passage than the said shafts C, and upon the shafts C' C' is mounted a series of circular brush-disks D' D', the said disks D' being arranged to alternate with the adjacent picker-disks and overlap the same, as clearly shown, and the brush-disks are also provided with the brush-teeth $d'$ on both faces of the same. Pulleys $c'$ $c'$ are mounted upon the upper ends of the shafts C' C'.

Vertical shafts $D^2$ $D^2$ are arranged at the forward outer ends of the divided platform $b$, said platform projecting forwardly beyond the front of the receiving-box, and the upper ends of the shafts $D^2$ are secured in brackets secured to the receiving-box near the top of the same. A series of horizontal guide-arms $d^2$ are secured in front to each shaft $D^2$, said arms curving inwardly and rearwardly and arranged in horizontal alignment with the picker-disks, the rear ends of the guide-arms nearly touching the said disks as they revolve. The guide-arms $d^2$ separate and guide the limbs of the plant in the proper direction to the picker-disks.

At the outer sides of the platform-sections and below the same the receiving-box is formed with horizontal chambers B' B', and in each of said chambers is arranged an endless horizontal conveyer-belt E, the shaft of the rear drum, over which the belt runs, being extended inward and provided with a sprocket $e$. The receiving-box is also provided with two vertical chambers $B^2$ $B^2$ at the opposite rear ends of the same, said chambers communicating with the horizontal chambers B' B', and in each of the vertical chambers is arranged a vertical elevator-belt F, having teeth $f$, and upon the extended end of the shaft of the lower drum is mounted a sprocket $e'$, which meshes with the sprocket $e$ of the conveyer-belt. The upper drums are mounted upon the same shaft G, said shaft extending across from one chamber to the other, and it will be noticed that the chambers $B^2$ $B^2$ extend above the top of the receiving-box. Stripping-rolls F' F' are arranged in each vertical chamber in front of the elevator-belt and adjacent to the same, said rolls being provided with teeth or prongs, by means of which sticks, twigs, &c., that may have escaped the guide-arms are stripped from the cotton as it is elevated. The rolls F' F' are mounted upon the same shaft and receive their motion from the shaft G by means of sprockets and belts. Gears G' and G' are mounted at opposite ends of the shaft G, and a sprocket-wheel $G^2$ is mounted on one end thereof.

A transverse horizontal shaft H is journaled in brackets $h$ upon the top of the receiving-box, said shaft having sprocket-wheels H' and $H^2$ at its opposite ends, and intermediate its ends are mounted gears $H^3$, which mesh with the gears $c$ upon the upper end of the shafts C. Beneath the gears $c$ upon shaft C are mounted pulleys $c^2$ $c^2$, said pulleys being connected with the opposite pulleys $c'$ on the ends of the shafts C' C' by means of the belts $c^3$ $c^3$.

The sprockets $G^2$ and $H^2$ are upon the same side of the machine and are connected by means of the belt $G^3$, and the gears G' at opposite ends of the shaft G mesh with gears $G^4$ $G^4$, mounted upon the outer ends of the brush-rolls K, said brush-rolls being arranged in chutes L, which communicate with the vertical chambers $B^2$ $B^2$ at their upper ends, the brush-rolls revolving in opposite directions to the elevator-belts, thereby brushing the cotton from the same into the chutes, whence it is deposited in sacks carried upon the rear platform.

Upright standards at the rear of the machine support the sprocket-wheels M and N at one side of the machine, and upon the same side a sprocket-wheel O is mounted to slide upon the axle of the traction-wheel, said sprocket having a clutch mechanism $o$, by means of which it may be thrown into and out of gear with the said drive-wheel. A belt P connects the sprockets N and O and a belt P' connects the sprockets M and H', and by this arrangement of gearing all the movements of the machine are effected, as will be more fully explained hereinafter.

The axle upon which my machine is mounted is bow or arch shaped, as shown, thus providing the vertical upright standards S S and top cross-beam S'. A lever T is pivoted upon the cross-beam S', said lever being connected with the top of the receiving-box by means of a link-rod $t$. A pitman T' is connected to the opposite end of the lever, said pitman being arranged upon the side of this box and connected at its lower end with the elbow-lever $T^2$. A hand-lever $T^3$ is pivoted to the main frame within reach of the driver, said lever being connected with a pitman $T^4$, which is also attached to the elbow-lever $T^2$, and by operating the hand-lever the power is communicated by means of the pitmen and elbow-lever to the lever T, and the box is raised or lowered, as the case may be. The upright standards act as guides to steady the movement of the box.

If it should be desired to make the receiving-box rigid with the main frame, the standards at the rear of the machine, the sprockets, and belts may be dispensed with and a belt run directly from the sprocket on the axle to the sprocket H'.

In operation the draft is applied to one side of the main frame and the plants will be guided into the receiving-box, and as the picker-disks are revolved in the direction indicated by the arrows the cotton will be picked from the pod and the plant left standing as the machine moves forward, the receiving-box being opened at the rear as well as the front. The cotton picked from the pods by the picker-disks is carried inward, where the brush-disks, overlapping the picker-disks and revolving in opposite directions, will brush all the cotton from the picker-disks and deposit it upon the horizontal conveyer-belts. From here the cotton is carried rearward until it is carried up by the elevator-belts, and any twigs, stems, &c., that may have escaped the guide-arms are stripped from the cotton by means of the stripping-brush. The cotton is then carried up until it meets with the brush-roll, which brushes it from the elevator-belt into a chute, which conducts it to the sack held upon the platform.

The gearing mechanism of the picker-disks and brush-disks is so arranged that the picker-disks will have a greater peripheral speed than the lineal speed of the machine, and the brush-disks revolving at a speed greater than the picker-disks thereby prevent entanglement of harvested material and clogging of the machine.

Having thus described my invention, what I claim as new is—

The combination, with a receiving-box suitably supported, of the upright shafts $D^2$, arranged upon opposite sides of the entrance to the same, the horizontal guide-arms $d^2$, attached to said shafts and curved inwardly within the box, the vertical revoluble shafts C, the picker-disks D, arranged thereon and having teeth upon both their upper and lower faces, the vertical revoluble shafts C', arranged to the sides of and rear of the shafts C, the stripping-disks D', having teeth $d'$ upon both their upper and lower faces, said disks D' alternating with the disks D, overlapping the same, and revolving in opposite directions, and the conveyer-belts, all arranged substantially as shown and described.

WILLIAM HODGE.

Witnesses:
J. S. McSPADDEN,
W. A. JAMES.